July 20, 1926.

F. G. WHITTINGTON 1,592,878

VEHICLE LAMP

Filed Jan. 24, 1923    2 Sheets-Sheet 1

Inventor:
Frederick G. Whittington
by Burton + Burton
his Attys.

Witness:

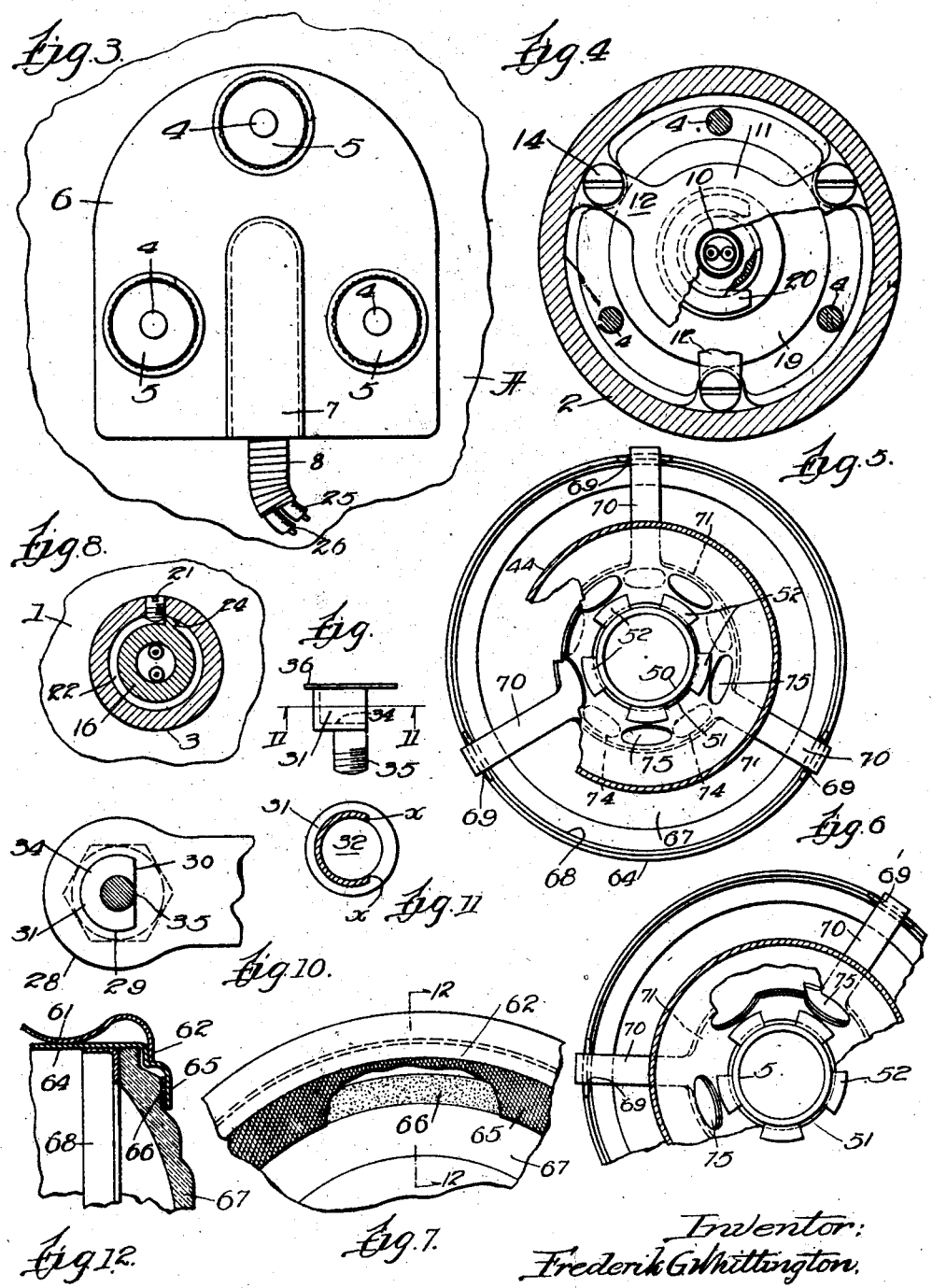

Patented July 20, 1926.

1,592,878

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

VEHICLE LAMP.

Application filed January 24, 1923. Serial No. 614,565.

The purpose of this invention is to provide a combined search-light and parking light for vehicles, that is adapted for mounting upon a forward wheel-fender, and for pivotal adjustment upon both a vertical and a transverse or horizontal axis. It consists in the features of construction and combinations of parts herein described as shown in the drawings and as pointed out by the claims.

In the drawings:

Figure 1 is a vertical section, partly in elevation, of a vehicle lamp embodying the invention, with the projector proper turned 90 degrees on its horizontal axis from the position shown in Figure 2.

Figure 2 shows in side elevation the lamp and a front vehicle-fender upon which it is mounted.
Figure 3 is a detail bottom plan view, taken as indicated by line 3—3 on Figure 1.

Figure 4 is a detail sectional view taken as indicated by line 4—4 on Figure 1, parts being broken away and the bracket 15 omitted.

Figure 5 is a detail sectional view taken as indicated by line 5—5 on Figure 1, certain parts being broken away and the shutter being shown in closed position.
Figure 6 is a fragmentary view similar to Figure 5, showing the shutter in open position.

Figure 7 is a fragmentary view, taken as indicated by line 7—7 on Fig. 1, of the shutter-actuating annular grip and associated parts.

Figure 8 is a detail sectional view taken as indicated by line 8—8 on Figure 1.

Figure 9 is a detail view of one of the trunnions.

Figure 10 is a detail sectional view of a trunnion taken as indicated by line 10—10 on Figure 1 and turned 90 degrees.

Figure 11 is a detail section taken on line 11 of Figure 9.

Figure 12 is a fragmentary radial section of the parts shown in Figure 7, taken as indicated by line 12 on the latter.

In Figure 1, the letter A denotes one of the front fenders of an automotive vehicle, and B denotes my improved lamp as mounted upon the fender. The cast base 1 for the lamp comprises a circular flange 2 and a tubular neck 3. The base is secured to the fender by screws 4 and round thumb-nuts 5, in preference to machine nuts. A protecting plate, 6, provided with a trough 7, for the cord-armor, 8, is fastened against the under side of the fender by the nuts 5. A hole 9 is drilled through the fender to receive this conduit and the inwardly pinched neck 10 of a metal contact-plate, 11, having arms, 12, secured to bosses in the base by screws 14.

The lamp shell, B, is mounted on pivots or trunnions between the arms of a bail or fork, 15, which stands vertically with its arms in transverse alinement respective to the vehicle, and is provided with a swivel post, 16, milled to fit rotatably in the bore of neck, 3, the top of the post terminating in an annular shoulder, 17, resting on a friction washer, 18. The post is retained in its mounting by a spring washer, 19, thrusting downwardly upon a "horseshoe" retaining washer, 20, seated in a groove in post 16 as shown. A set-screw, 21, engaging a non-continuous annular groove, 22, in the post, 16, may be tightened to lock the fork 15 in adjusted position, though ordinarily the fork will be prevented from accidental turning by the friction between washer, 18, and the adjacent surfaces. The groove, 22, being non-continuous, provides a stop lug, 24, integral with post 16, which prevents a full revolution of the post and thus protects the conducting cord, which extends through the base of the post, 16. From the post the two strands, 25 and 26, of the cord extend respectively in opposite directions in a groove in the fork, 15, this groove containing the strands and a superposed protecting strip, 27, which is fitted therein flush with the inner face of the fork, as shown.

The end portion, 28, of each fork-arm is preferably constructed as best shown in Figure 10. A partly circular hole, 29, having a flat side, 30, (which is at the bottom in the upright position of the fork) receives and fits upon a cylindrical trunnion, 31, cut away at x—x to admit the conductor cord and having a bore, 32, therein. The end wall, 34, of said bore, is integral with a threaded concentric stud, 35. At the inner end of the trunnion is an outstanding annular flange, 36, beneath which is inserted a dished spring washer, 37, bearing upon the anterior member, 38, of the lamp shell or body. The trunnion is secured in position by a nut, 40, which draws the trunnion against the spring washer, 37, with an adjustable degree of tension. In order to increase the turning friction between the lamp body and the fork, a friction washer, 43, is placed on each trunnion between the said parts. This construction is duplicated for each fork arm and trunnion bearing for the lamp body.

The anterior member, 38, of the lamp shell or body is annular and is provided with alined circular openings which fit rotatably upon the trunnions. The front edge of port 38 is beaded as at 41, for retaining the clear glass lens, 42 associated with the search-light. This lens is held in position by the reflector 44 and by a dull-finished ring, 45, of angular cross section, a felt ring, 46, being interposed next to the lens for a dust-seal and to prevent rattling. The larger periphery of reflector, 44, is rearwardly flanged as shown at 47, and this flange closely fits within the member, 38.

The posterior portion 48 of said reflector is tapered inwardly and rearwardly, and bears at its end an inturned flange, 49, to which the bulb-socket mounting is attached in any suitable manner. As shown, the socket, 50, is mounted in a closely fitting tube, 51, having at its upper end a number of outwardly bent segmental ears, 52, of which, alternate ones lie above and below said flange, 49; whereby the bulb socket is mounted virtually in the base of the reflector. The base 54, of the bulb, 55, is mounted in the socket in the usual manner, and a familiar focusing device, shown at 56, is provided.

The contact springs, 57, are supported in insulated holders mounted in a pair of angular lugs, 58, fastened to opposite sides of the mounting tube, 51. Said springs are connected with the terminals of conductors 25, 26 by bolts, 59, respectively.

The elements provided for the purpose of including a parking-light in addition to the search-light, will now be described. These elements are, essentially, a colored lens positioned at the opposite side of the bulb from the clear lens, 42, means to permit a portion of the light emitted from said bulb to pass rearwardly through the colored lens, or a reflector; and, desirably, a shutter by means of which the said light may be cut-off entirely, while the bulb, 55, remains illuminated.

As shown in Figure 1, the rear half, 39, of the shell B is fitted to a flange, 60, on the front member, 38. The rearward portion of member, 39, is formed at 61 and 62 to support a hollow cylindrical member, 64, whose inner surface is silvered to form the parklight reflector above mentioned. This ring is positively held from rearward movement by the flange, 62, and its inner periphery is formed with an inturned flange, 65, which supports a dust-ring and pad, 66, of felt or the like, on which the ruby lens, 67, is mounted. This lens is retained by a metal retaining-ring 68. The outer face of flange, 65, is knurled (see Figure 7) whereby the reflector ring is manually rotatable by pressing thereon with the fingers and exerting a turning force. In the anterior edge of the reflector ring 64 are several notches, 69, which receive the ends of radial arms 70 integral with the shutter, 71, which is a frusto-conical sleeve fitted close to, and rotatably upon, the inner portion of the main reflector, 44; the smaller end of the shutter being in contact with and supported by a thin ring, 72 (Figure 1) resting on ears 52 of mounting tube 51. A series of apertures, 74, in the shutter, are registrable with a series of apertures, 75, in the reflector-base, 48, and the spaces between the apertures is equal to or greater than the diameters of the apertures, so that the light may be completely shut off from lens 67 when the vehicle is in motion.

The lighting-bulb which I prefer to employ for the purpose of economizing electricity, is provided with two filaments, 76 and 77, one of which is of higher illuminating power than the other. The common lead, 78, is connected to the lamp base, the other leads 79, being respectively connected to the contact-studs 80. The current flows from the lamp base through the various metal parts of the instrument to the base, 1, thence to plate, 11, and to the metal cord armor 8. The conductors 25, 26 are led to a two-point switch, not shown by which the operator may light either filament—the high powered one for use as a search or "trouble" light or the low powered one when a parking light is required. When driving with the lamp bulb, 55, in use and particularly if the high power filament, 76, is in circuit it is preferable to protect the driver and passengers from any glare through the rear ends, 67, by closing the shutter manually by rotation of the knurled flange, 65.

In search-lights of this type I find it possible to prevent distortion of the light rays by the peripheral portion of the reflector if the ring 45 be made with a dull finish as described so as to confine reflection of the light to the parabolic portion of the reflector, 44.

I claim:—

1. In a vehicle, in combination with a substantially horizontally extending, exteriorly exposed rigid member adapted to afford a supporting surface for a lamp, a lamp-supporting bracket comprising a horizontally-extended base formed as to its under side for seating on said surface and having an upwardly projecting stem; a lamp-supporting member which is swiveled in the stem of the bracket for turning about a vertical axis, the vehicle member having an aperture in alignment with the swivel axis of the bracket stem, said bracket stem being axially apertured to register with said aperture in the vehicle member to accommodate current wires to the lamp leading in from below the vehicle member through said registering apertures, and a contact plate interposed between the vehicle member and the bracket apertured and clinched at the margin of its aperture in the aperture in the vehicle member for guarding the inleading wires and secured to the under side of the bracket, the bracket being secured to the vehicle member eccentrically with respect to the registered apertures of the bracket and vehicle members.

2. In combination with the construction defined in claim 1, foregoing, a lamp body comprising a reflector and means for mounting a lamp bulb axially in predetermined focal relation with respect to the reflector, said lamp body being pivoted upon and between the yoke arms for rocking movement and continuous electric circuit wires leading in through the registered apertures of the vehicle member and the yoke stem and into the lamp body for connection therein with a lamp bulb, the lamp body being apertured for said inleading circuit wires substantially in alignment with an axis of the pivot of the lamp body to the yoke arms, whereby the swinging of the lamp body about its pivots requires no slack in the continuous inleading wires.

3. In combination with a lamp body comprising a concave reflector and means for mounting a lamp bulb at the axis of the reflector, a forked supporting bracket for the lamp body, said lamp body being pivoted to the bracket arms for swinging about an axis transverse to the axis of the reflector; trunnions adapted to be secured to the bracket arms respectively, and having swivel-wise engagement with the lamp body, said trunnions having an axial cavity leading from the inner end and having a lateral aperture leading into the axial cavity for admitting the in-leading circuit wires to energize the lamp.

4. In combination, a lamp member containing an electric light projector, a pair of supporting arms each provided with a groove at its inner face, and hollow trunnions constituting pivotal connections with the lamp shell and said arm, the cavities of the hollow trunnions, respectively, having each a lateral opening registering with the grooves of the arms respectively, for accommodating and admitting the in-leading circuit wires.

5. A pivot mounting for a vehicle lamp, comprising in combination, an arm provided with a partly circular opening, a hollow trunnion shaped to fit said opening, and having a threaded extension of reduced diameter to receive a fastening nut; a flange on the end opposite said extension, a shell wall having a pivot hole through which the trunnion extends, and a spring washer on the trunnion between the shell and the flange, pressing the shell wall toward the adjacent face of the trunnion.

6. In a searchlight, the combination of a shell having at one head thereof a clear lens and at the opposite head a colored lens; a source of light located between said lenses, and adapted to illuminate both lenses simultaneously; means for limiting the illumination of the colored lens relatively to the clear lens, and means operable at will for excluding the light from the colored lens while the clear lens remains fully illuminated.

7. In a searchlight, the combination of a shell having at one head thereof a clear lens and at the opposite head a colored lens; a source of light located between said lenses, an opaque ring provided with a circularly spaced series of apertures for permitting a portion of the light from said source to shine through the colored lens, and a rotatably mounted shutter having registrable apertures, said shutter being for excluding such light from the colored lens at will.

8. In the structure defined in claim 7, an annular member mounted rotatably in the shell, one end thereof being engaged with the shutter and the other end projecting through a circular opening in the shell to provide access to said member for moving the shutter.

9. In the construction defined in claim 7 an annular member mounted rotatably in the shell, one end thereof being engaged with the shutter and the other end projecting through a rear opening in the shell, said projection portion being adapted to form a mounting for said color lens.

10. In combination, a frusto-conical shutter provided with radial arms, a support for the shutter, an outer shell, an annular member rotatably mounted in the shell and having detachable engagement with the shutter arms whereby the shutter may be turned by turning said member.

11. In a parking lamp for vehicles, the combination of a source of light, a shell in which the same is mounted, a cylindrical member of larger diameter than said source located within the shell, concentric with but offset in an axial direction from said source, a lens mounted in said member toward the end thereof which is the more remote in the direction of said offsetting from the light source, the inner surface of said member having high reflecting power, and a shutter located toward the opposite end of said member for admitting light to said reflector or excluding it therefrom.

In testimony whereof, I have hereunto set my hand at Chicago, Illinois, this 19th day of January, 1923.

FREDERIK G. WHITTINGTON.